(12) United States Patent
Radhakrishnan et al.

(10) Patent No.: US 12,174,716 B2
(45) Date of Patent: Dec. 24, 2024

(54) ACCELERATOR SCHEDULING BASED ON COOLING CHARACTERISTICS

(71) Applicant: Dell Products L.P., Round Rock, TX (US)

(72) Inventors: Ramesh Radhakrishnan, Austin, TX (US); Elizabeth Raymond, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 257 days.

(21) Appl. No.: 17/383,375

(22) Filed: Jul. 22, 2021

(65) Prior Publication Data

US 2023/0034105 A1    Feb. 2, 2023

(51) Int. Cl.
  G06F 11/22    (2006.01)
  G06F 9/50    (2006.01)
  G06F 11/26    (2006.01)
  G06F 11/30    (2006.01)
  G06T 1/20    (2006.01)

(52) U.S. Cl.
  CPC ........ *G06F 11/2284* (2013.01); *G06F 9/5044* (2013.01); *G06F 9/5094* (2013.01); *G06F 11/26* (2013.01); *G06F 11/3058* (2013.01); *G06T 1/20* (2013.01)

(58) Field of Classification Search
  None
  See application file for complete search history.

(56) References Cited

U.S. PATENT DOCUMENTS

| | | | | |
|---|---|---|---|---|
| 6,076,127 A | * | 6/2000 | Chin | G06F 13/364 |
| | | | | 710/100 |
| 9,513,972 B2 | * | 12/2016 | Hsiao | G06F 9/5094 |
| 2014/0344827 A1 | * | 11/2014 | Mavila | G06F 9/4893 |
| | | | | 718/104 |
| 2017/0017288 A1 | * | 1/2017 | Bose | G06F 1/3287 |

* cited by examiner

*Primary Examiner* — Eric C Wai
(74) *Attorney, Agent, or Firm* — Jackson Walker L.L.P.

(57) ABSTRACT

An information handling system may include at least one central processing unit (CPU); and a plurality of special-purpose processing units. The information handling system may be configured to: receive information regarding cooling characteristics of the plurality of special-purpose processing units; and assign identification (ID) numbers to each of the plurality of special-purpose processing units in an order that is determined based at least in part on the cooling characteristics.

18 Claims, 6 Drawing Sheets

ACCELERATOR SCHEDULING BASED ON COOLING CHARACTERISTICS

TECHNICAL FIELD

The present disclosure relates in general to information handling systems, and more particularly to the scheduling of processing workloads on accelerator hardware.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is becoming more common for information handling systems to include special-purpose processing units, also referred to herein as accelerators. Throughout this disclosure, for the sake of concreteness, the specific example of GPUs will be discussed in detail. One of ordinary skill in the art with the benefit of this disclosure will understand its application to other types of special-purpose processing units.

Multi-GPU systems, for example, may provide very high computation density, as well as fast interconnections (e.g., NVIDIA® NVLink 2.0, GPUDirect, etc.). This makes such systems particularly useful in fields such as distributed deep learning training and other fields involving parallelizable computation. For example, such systems may in some embodiments be used for general-purpose computing on graphics processing units (GPGPU) tasks.

In many cases, however, the majority of the compute jobs executed on multi-GPU systems tend to be executed on a single GPU or on a subset of the available GPUs. Existing GPU scheduling frameworks (e.g., executing in the host operating system) may assume that all GPUs are equal, and thus they do not differentiate based on slot or physical position in the server, or on the availability of direct communication links between particular GPUs. But such considerations may have a large impact on GPU temperatures and application performance. This results in an allocation of GPUs to workloads that may result in non-optimal performance for workloads that do not utilize all GPUs in the system.

For example, consider the case of a system with 4 GPUs. An existing scheduling solutions might simply assign a two-GPU workload to GPUs 0 and 1, even though other GPUs might be positioned within the chassis to receive more airflow and thus provide higher performance.

With increasing numbers of GPUs and complicated thermal and connectivity considerations, it becomes highly non-trivial to schedule compute jobs in an efficient manner.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with scheduling of processing workloads on accelerator hardware in information handling systems may be reduced or eliminated.

In accordance with embodiments of the present disclosure, an information handling system may include at least one central processing unit (CPU); and a plurality of special-purpose processing units. The information handling system may be configured to: receive information regarding cooling characteristics of the plurality of special-purpose processing units; and assign identification (ID) numbers to each of the plurality of special-purpose processing units in an order that is determined based at least in part on the cooling characteristics.

In accordance with these and other embodiments of the present disclosure, a method may include an information handling system that includes a plurality of special-purpose processing units receiving information regarding cooling characteristics of the plurality of special-purpose processing units; and the information handling system assigning identification (ID) numbers to each of the plurality of special-purpose processing units in an order that is determined based at least in part on the cooling characteristics.

In accordance with these and other embodiments of the present disclosure, an article of manufacture may include a non-transitory, computer-readable medium having computer-executable code thereon that is executable by a processor of an information handling system that includes a plurality of special-purpose processing units, the code being executable for: receiving information regarding cooling characteristics of the plurality of special-purpose processing units; and assigning identification (ID) numbers to each of the plurality of special-purpose processing units in an order that is determined based at least in part on the cooling characteristics.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-6, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

Figure 1:
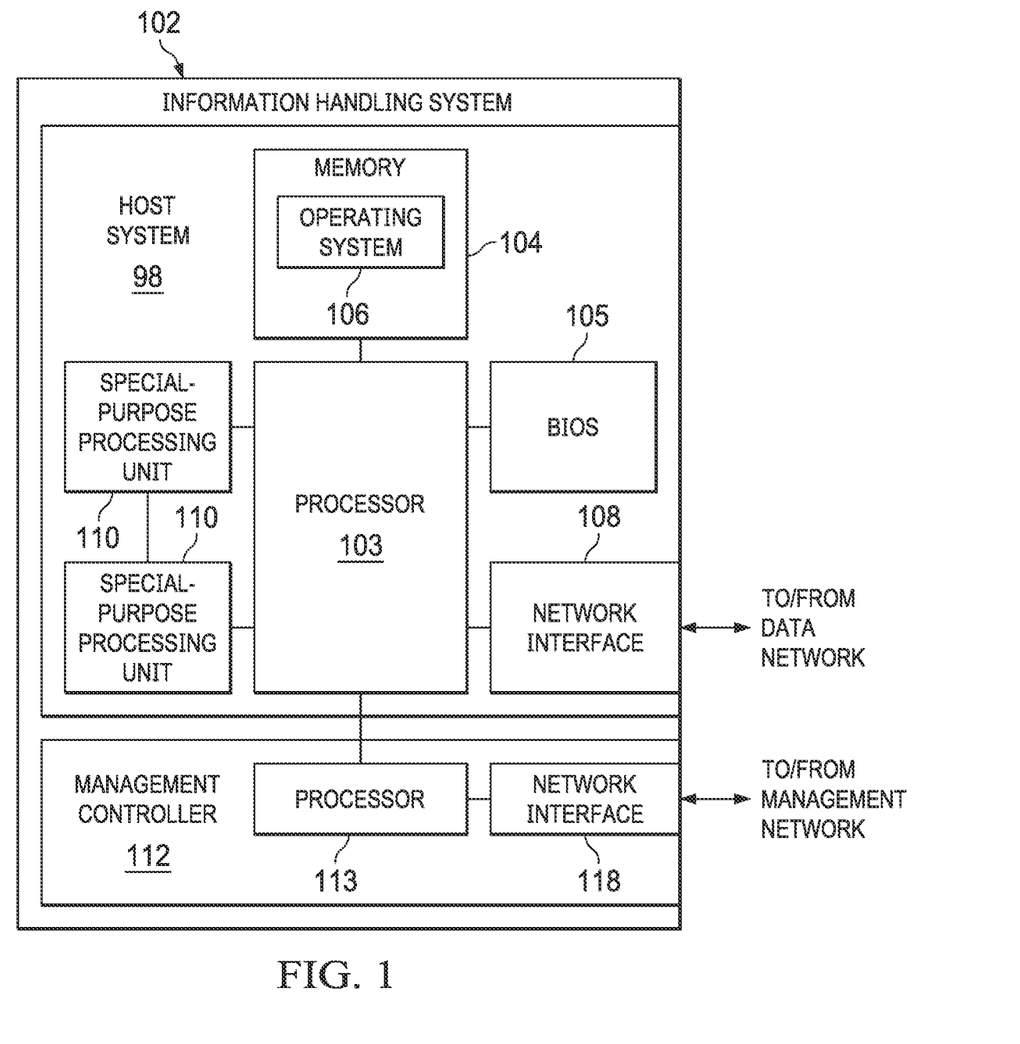
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives, solid-state drives, and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Information handling system 102 may also include one or more special-purpose processing units 110. For purposes of this disclosure, the terms "special-purpose processing unit" and "accelerator" may be used interchangeably.

Special-purpose processing units 110 may generally include any type of processor other than a central processing unit (CPU). For example, special-purpose processing units 110 may include GPUs. Such GPUs may in various embodiments be integrated into a motherboard or backplane, be implemented on separate expansion cards (e.g., Peripheral Component Interconnect Express (PCIe) cards), or be implemented on a single expansion card. In some embodiments, although not illustrated in FIG. 1, special-purpose processing units 110 may also be coupled to processor 113 of management controller 112. Although FIG. 1 illustrates one processor 103 and two special-purpose processing units 110, one of ordinary skill in the art will understand that any suitable number of such devices may be used.

Figure 2:
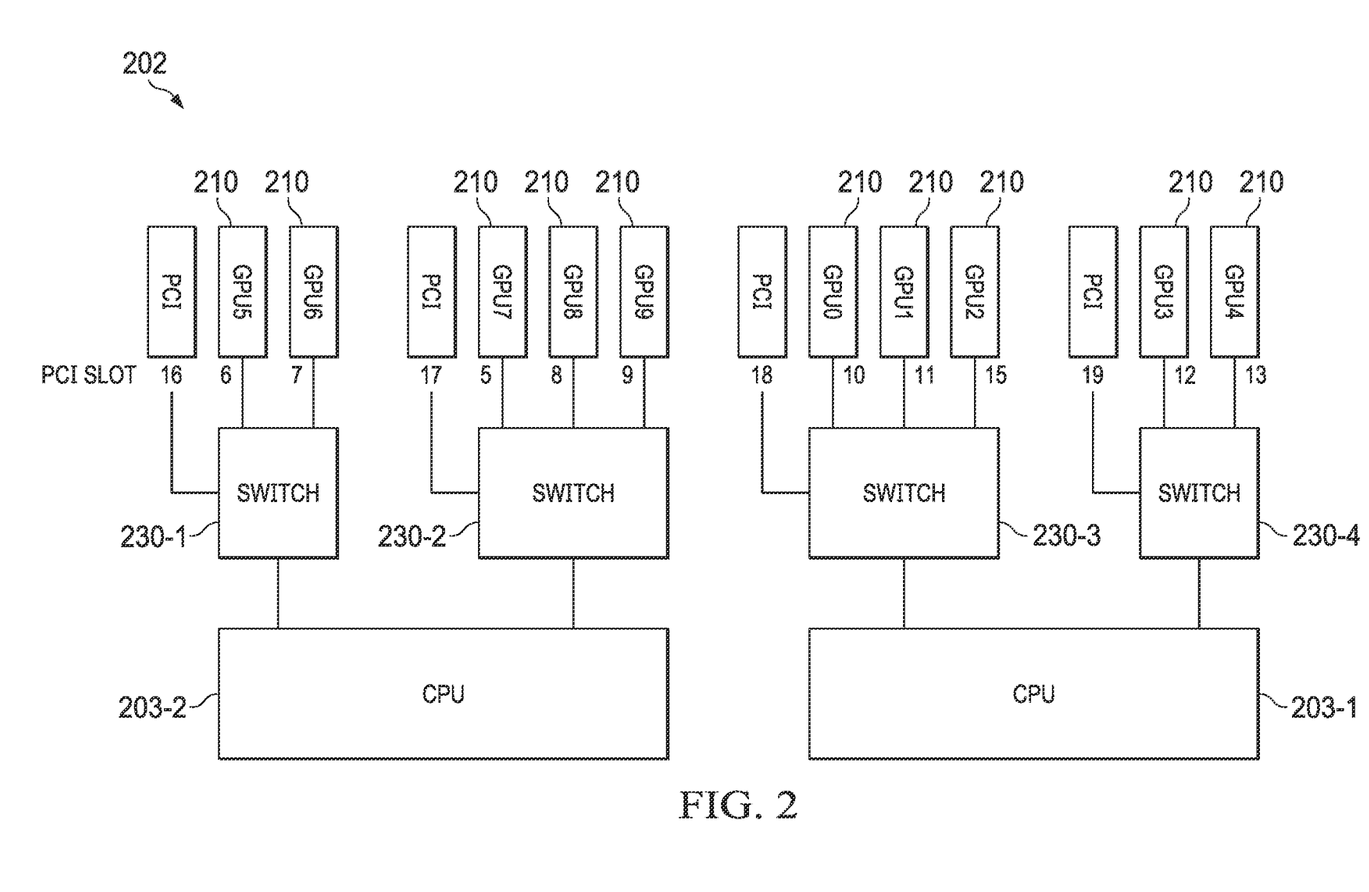
FIG. 2 illustrates a block diagram of selected components of another information handling system, in accordance with embodiments of the present disclosure.

For example, FIG. 2 illustrates selected components of an information handling system 202 in which two processors 203-1 and 203-2 (collectively, processors 203) are coupled to ten GPUs 210 via four switches 230-1, 230-2, 230-3, and 230-4 (collectively, switches 230). In this example, the switches and GPUs are PCI/PCIe devices, but in other embodiments different types of connectivity technologies may be used.

Further, in some embodiments, some or all of the GPUs 210 may be coupled directly to one another via one or more peer-to-peer links (not shown in FIG. 2). As one of ordinary skill in the art with the benefit of this disclosure will appreciate, the performance characteristics of GPUs 210 may depend on how they are coupled together.

For example, GPUs that are linked directly with peer-to-peer links may have a large amount of bandwidth for transferring data with each other. GPUs that are coupled via the same switch 230 may have a lower amount of bandwidth. GPUs that are coupled via different switches 230 but coupled to the same processor 203 may have a still lower amount of bandwidth. GPUs that are coupled to different processors 203 may have the lowest amount of bandwidth.

The different amounts of bandwidth available among various ones of GPUs 210 may affect decisions about how multi-GPU compute jobs should be allocated. Further, thermal considerations as mentioned above may affect such decisions. Still further, it may be desirable in some cases not to schedule jobs in a way that would interfere with some other component. For example, if a high-performance network interface is installed in PCI slot 16 on switch 230-1, then that interface may saturate switch 1, and so in situations in which fewer than all of the GPUs 210 are needed, it may be desirable not to use the ones that are coupled to switch 230-1. However, in other situations the opposite may be desirable—for example, in a GPUDirect scenario in which high-speed direct memory access (DMA) transfers between GPUs require a network interface coupled to the same switch.

Rather than change existing scheduling tools that assign jobs to GPUs with low ID numbers (e.g., PCIe device bus IDs), some embodiments of this disclosure may adjust scheduling priorities by changing the way in which such ID numbers are assigned to the GPUs. Then the existing scheduling tools can continue to run unmodified, but the changed ID numbers will mean that different GPUs are being assigned tasks.

For example, some embodiments may improve upon existing scheduling solutions by first assigning a default GPU ID numbering scheme at boot via a management controller based on engineering testing and feedback, but allowing a user to run tests (e.g., to address faulty GPUs or a configuration that impedes airflow to some GPUs) and reassign the IDs during boot. Further, some embodiments may have provisions for allowing a user to perform manual assignment of GPU IDs to prioritize specific architectures to support processes such as GPUDirect.

The default ID numbering may be based on a prioritization of thermal performance in systems in which all sockets are populated and have identical GPUs. In systems with GPUs in PCIe slots, the default ID numbering may create zones that cover a group of physically and/or electronically nearby slots (e.g., front of chassis, back of chassis, slots on the same non-uniform memory access (NUMA) node, etc.). In systems with PCIe switches or an NVLink bridge, the default ID numbering may prioritize GPU peer-to-peer connectivity first, unless a GPU is indicated as being especially thermally sensitive (e.g., a faulty GPU or one that otherwise cannot handle high temperatures).

The boot-time testing and reassignment mentioned above may include a system utility that runs GPU thermal stress tests and stores GPU temperature information. The utility may assign new IDs if an ordering is discovered that is preferable to the default ordering. In some embodiments, the utility may detect populated slots and their GPU and networking capabilities, and then assign GPUs IDs based on the populated system configuration.

Figure 3:
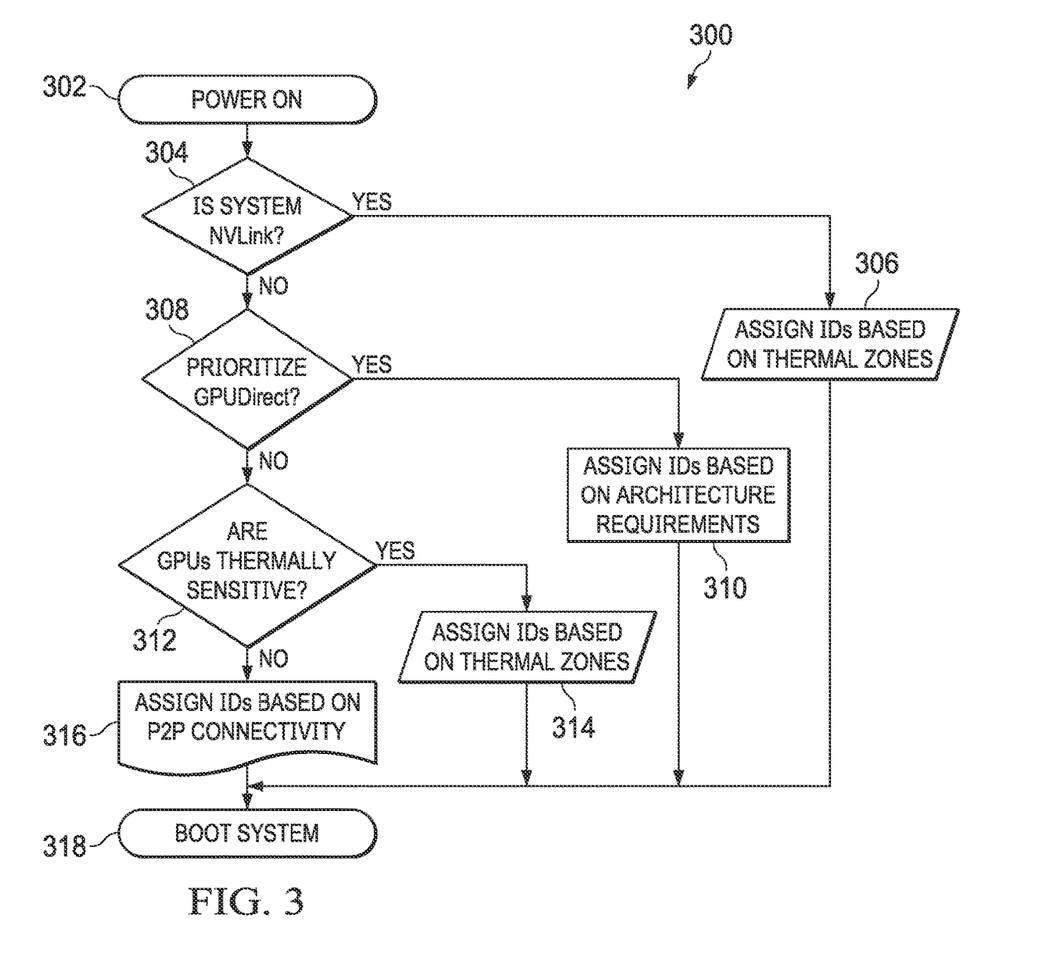
FIGS. 3-6 illustrate example methods, in accordance with embodiments of the present disclosure.

Turning now to FIG. 3, a flowchart of a high-level method 300 according to some embodiments of this disclosure is shown. This method may be implemented, in some embodiments, via a profile executed by a management controller of a system in order to optimize the GPU device ID ordering so that workloads may be allocated in an improved manner.

Figure 4:
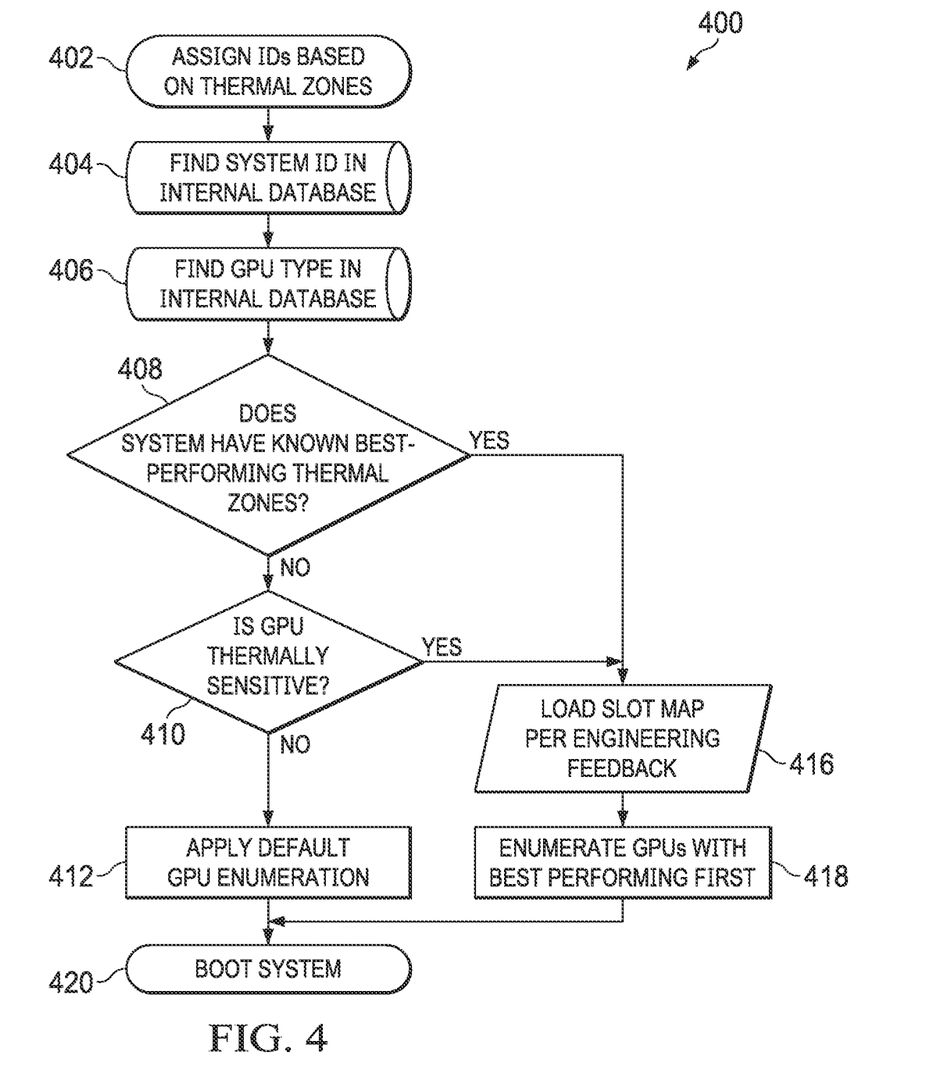

At step 302, the system is powered on. If a determination is made at step 304 that the system uses NVLink, then the method may determine that GPU IDs should be assigned based on thermal zones at step 306. FIG. 4 provides more details.

Figure 5:
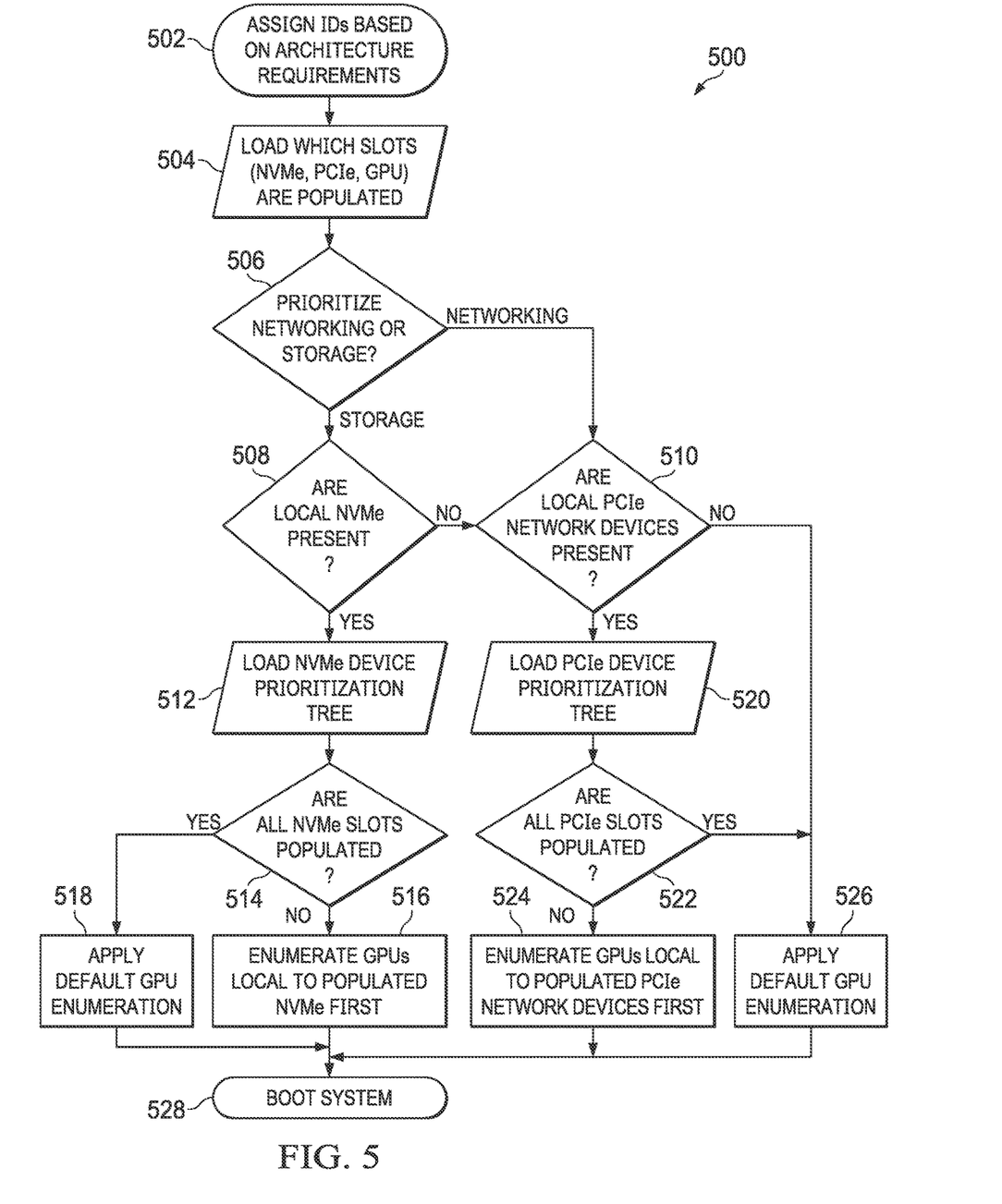

If the system does not use NVLink, then a determination may be made at step 308 regarding whether GPUDirect should be prioritized. If so, then the method may determine that GPU IDs should be assigned based on architecture requirements at step 310. FIG. 5 provides more details.

If GPUDirect is not prioritized, then a determination may be made at step 312 regarding whether the GPUs are thermally sensitive. If so, then the method may determine that GPU IDs should be assigned based on thermal zones at step 314. FIG. 4 provides more details.

Figure 6:
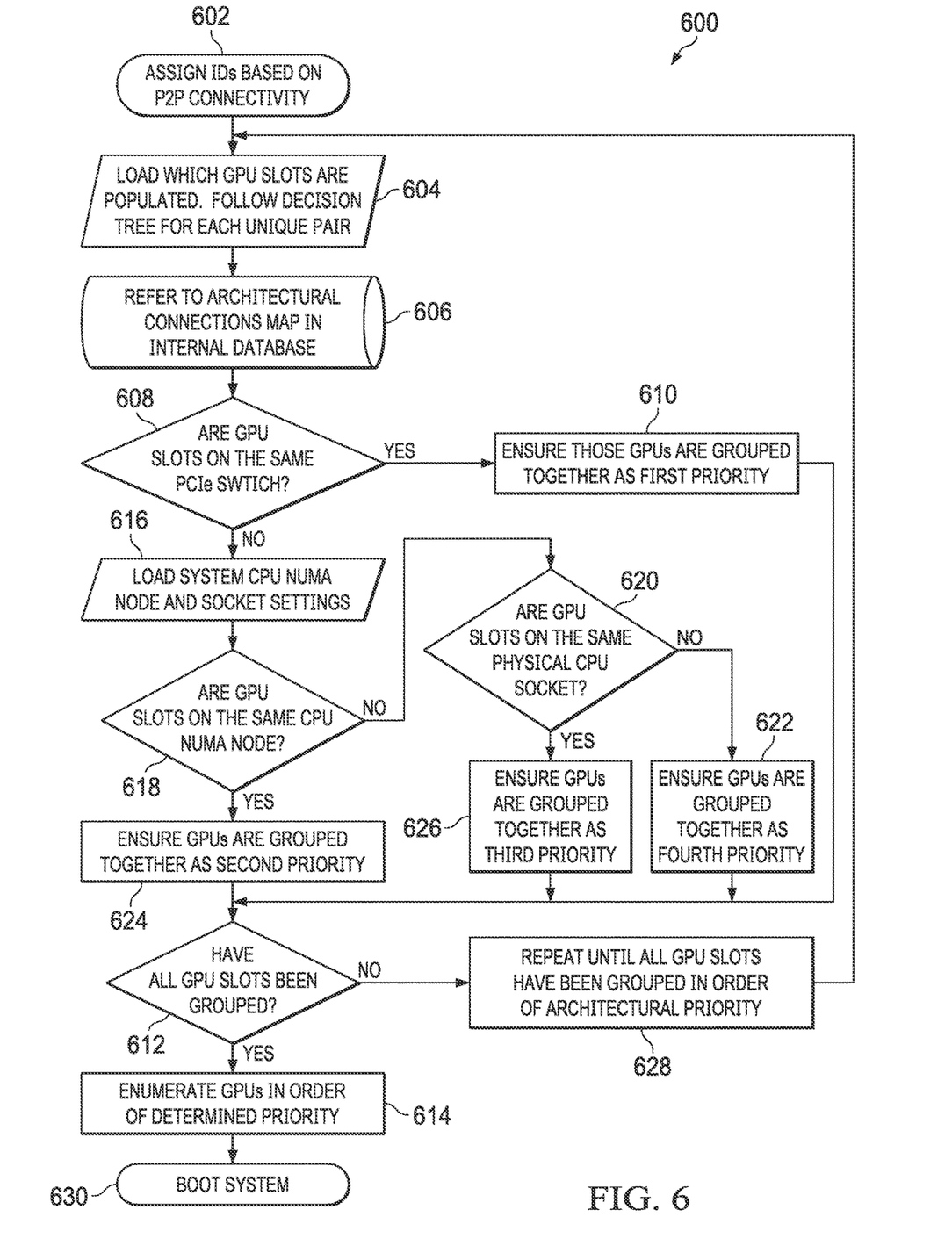

If the GPUs are not thermally sensitive, then the method may determine that GPU IDs should be assigned based on peer-to-peer connectivity at step 316. FIG. 6 provides more details.

At step 318, the system may continue the boot process and method 300 may end.

Turning now to FIG. 4, a flowchart of a method 400 according to some embodiments of this disclosure is shown. This method may be executed, in some embodiments, when method 300 indicates that IDs should be assigned based on thermal zones at step 306 and/or step 314.

At steps 404 and 406, an internal database may be consulted to determine the system ID and GPU type. For example, a firmware or other storage device of a management controller of the system may include data regarding a plurality of system configurations, and the method may determine which of that plurality actually corresponds to the system in question.

Based on these determinations, the method may determine at step 408 whether there are any known best-performing thermal zones. If not, then a determination may be made regarding whether the GPUs are thermally sensitive at step 410. If there are any known best-performing thermal zones or if the GPUs are thermally sensitive, then at step 416 a slot map may be loaded based on the manufacturer's engineering feedback. The slot map may include information about which regions of the system have the best cooling characteristics. Based on the slot map, the GPUs may be enumerated such that the best-performing GPUs are enumerated first (e.g., with the lowest ID numbers).

If the GPUs are not thermally sensitive, then a default GPU enumeration may be applied at step 412. At step 420, the system may continue the boot process and method 400 may end.

Turning now to FIG. 5, a flowchart of a method 500 according to some embodiments of this disclosure is shown. This method may be executed, in some embodiments, when method 300 indicates that IDs should be assigned based on architecture requirements (e.g., requirements of GPUDirect, etc.) at step 310.

At step 504, a determination may be made as to which slots (e.g., Non-Volatile Memory Express (NVMe), PCIe, GPU, etc. slots) are populated. At step 506, a decision may be made regarding whether networking or storage should be prioritized. In general, storage mode may be used in situations in which the GPUs are configured to retrieve data directly from a drive (e.g., an NVMe drive). Networking mode may be used in which the GPUs are configured to retrieve data from remote storage over the network and/or to prioritize GPU-GPU (peer-to-peer) DMA communication across nodes over the network.

If storage is prioritized and local NVMe drives are present at step 508, then an NVMe device prioritization tree may be loaded at step 512 to determine which NVMe devices are most likely to be used by processing jobs. If fewer than all of the NVMe slots are populated, then those GPUs that are local to the populated NVMe slots may be enumerated first at step 516 to receive the lowest ID numbers. If all NVMe slots are populated, then a default GPU enumeration may be applied at step 518.

If networking is prioritized (or if no local NVMe devices are present), then the method may determine whether any local PCIe networking devices are present at step 510. If not, then a default GPU enumeration may be applied at step 526. If local PCIe network devices are present, then the NVMe device prioritization tree may be loaded at step 520. If fewer than all of the PCIe slots are populated, then those GPUs that are local to the populated PCIe slots may be enumerated first at step 524 to receive the lowest ID numbers. If all PCIe slots are populated, then a default GPU enumeration may be applied at step 526.

At step 528, the system may continue the boot process and method 500 may end.

Turning now to FIG. 6, a flowchart of a method 600 according to some embodiments of this disclosure is shown. This method may be executed, in some embodiments, when method 300 indicates that IDs should be assigned based on peer-to-peer connectivity at step 316.

At step 604, the method may determine which GPU slots are populated. The remainder of method 600 may be carried out repeatedly for each unique pair of populated slots.

At step 606, an internal database may be consulted to determine an architectural connections map, which may indicate which GPUs are connected to one another in a peer-to-peer fashion.

At step 608, if the pair of slots are on the same PCIe switch, then at step 610 the method may ensure that those GPUs are grouped together as a first priority. If they are not on the same PCIe switch, then at step 616 the method may determine the system's NUMA node and socket settings, which may be used at steps 618 and 620.

If the GPU slots are on the same NUMA node, then at step 624 the method may ensure that the GPUs are grouped together as a second priority. If they are not on the same NUMA node, then at step 620 the method may determine whether they are on the same physical CPU socket.

If the GPU slots are on the same physical CPU socket, then at step 626 the method may ensure that they are grouped together as a third priority. If they are not on the same physical CPU socket, then at step 622, the method may ensure that they are grouped together as a fourth priority.

The above steps may be repeated at step 612 until all GPU slots have been grouped. At step 614, the GPUs may be enumerated in groups, in order of the determined priorities.

At step 630, the system may continue the boot process and method 600 may end.

One of ordinary skill in the art with the benefit of this disclosure will understand that the preferred initialization point for the method depicted in FIGS. 3-6 and the order of the steps comprising those methods may depend on the implementation chosen. In these and other embodiments, the methods may be implemented as hardware, firmware, software, applications, functions, libraries, or other instructions. Further, although FIGS. 3-6 disclose a particular number of steps to be taken with respect to the disclosed methods, the methods may be executed with greater or fewer steps than depicted. The methods may be implemented using any of the various components disclosed herein (such as the components of FIG. 1), and/or any other system operable to implement the methods.

Accordingly, in some embodiments of the present disclosure, a management controller may use methods such as those depicted in FIGS. 3-6 to reassign GPU IDs. Tables 1 and 2 below show an example. In Table 1, GPUs are assigned IDs without regard to thermal or connectivity considerations.

TABLE 1

(standard GPU initialization).

| Index | Bus ID | GPU Serial Number | Slot Number |
|---|---|---|---|
| 0 | 00000000:62:00.0 | WWWWWWW | 7 |
| 1 | 00000000:66:00.0 | XXXXXXX | 8 |
| 2 | 00000000:68:00.0 | YYYYYYY | 9 |
| 3 | 00000000:6C:00.0 | ZZZZZZZ | 10 |

The assignment shown in Table 1 may be non-optimal, however. Based on considerations such as those discussed above, the management controller may select an improved ordering for the GPUs as shown in Table 2 below.

TABLE 2

(improved GPU initialization).

| Index | Bus ID | GPU Serial Number | Slot Number |
|---|---|---|---|
| 0 | 00000000:62:00.0 | YYYYYYY | 9 |
| 1 | 00000000:66:00.0 | ZZZZZZZ | 10 |
| 2 | 00000000:68:00.0 | WWWWWWW | 7 |
| 3 | 00000000:6C:00.0 | XXXXXXX | 8 |

With the arrangement shown in Table 2, a workload that needs two GPUs would automatically be assigned those in slots 9 and 10, which have improved airflow compared to those in slots 7 and 8.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
at least one central processing unit (CPU); and
a plurality of special-purpose processing units;
wherein the information handling system is configured to:
receive information regarding cooling characteristics of the plurality of special-purpose processing units;
assign identification (ID) numbers to each of the plurality of special-purpose processing units in an order that is determined based at least in part on the cooling characteristics, wherein the ID numbers are Peripheral Component Interconnect Express (PCIe) bus ID numbers;
execute a scheduling tool that is configured to assign jobs to the plurality of special-purpose processing units based solely on their respective ID numbers; and
perform the jobs at the plurality of special-purpose processing units according to the assignments of the scheduling tool.

2. The information handling system of claim 1, wherein the special-purpose processing units are graphics processing units (GPUs).

3. The information handling system of claim 1, further configured to, during a boot process of the information handling system:
execute a thermal stress test; and
based on results of the thermal stress test, reassign the ID numbers to each of the plurality of special-purpose processing units in a different order.

4. The information handling system of claim 1, further configured to:

receive input from a user of the information handling system; and based on the input, reassign the ID numbers to each of the plurality of special-purpose processing units in a different order.

5. The information handling system of claim 1, wherein the ID numbers are assigned by a management controller of the information handling system.

6. The information handling system of claim 1, wherein the order is further determined based at least in part on peer-to-peer connectivity of the plurality of special-purpose processing units.

7. A method comprising:

an information handling system that includes a plurality of special-purpose processing units receiving information regarding cooling characteristics of the plurality of special-purpose processing units;

the information handling system assigning identification (ID) numbers to each of the plurality of special-purpose processing units in an order that is determined based at least in part on the cooling characteristics, wherein the ID numbers are Peripheral Component Interconnect Express (PCIe) bus ID numbers;

the information handling system executing a scheduling tool that is configured to assign jobs to the plurality of special-purpose processing units based solely on their respective ID numbers; and the information handling system performing the jobs at the plurality of special-purpose processing units according to the assignments of the scheduling tool.

8. The method of claim 7, wherein the special-purpose processing units are graphics processing units (GPUs).

9. The method of claim 7, further comprising, during a boot process of the information handling system:

the information handling system executing a thermal stress test; and based on results of the thermal stress test, the information handling system reassigning the ID numbers to each of the plurality of special-purpose processing units in a different order.

10. The method of claim 7, further comprising:

the information handling system receiving input from a user; and based on the input, the information handling system reassigning the ID numbers to each of the plurality of special-purpose processing units in a different order.

11. The method of claim 7, wherein the ID numbers are assigned by a management controller of the information handling system.

12. The method of claim 7, wherein the order is further determined based at least in part on peer-to-peer connectivity of the plurality of special-purpose processing units.

13. An article of manufacture comprising a non-transitory, computer-readable medium having computer-executable code thereon that is executable by a processor of an information handling system that includes a plurality of special-purpose processing units, the code being executable for:

receiving information regarding cooling characteristics of the plurality of special-purpose processing units;

assigning identification (ID) numbers to each of the plurality of special-purpose processing units in an order that is determined based at least in part on the cooling characteristics, wherein the ID numbers are Peripheral Component Interconnect Express (PCIe) bus ID numbers;

executing a scheduling tool that is configured to assign jobs to the plurality of special-purpose processing units based solely on their respective ID numbers; and performing the jobs at the plurality of special-purpose processing units according to the assignments of the scheduling tool.

14. The article of claim 13, wherein the special-purpose processing units are graphics processing units (GPUs).

15. The article of claim 13, wherein the code is further executable for, during a boot process of the information handling system:

executing a thermal stress test; and based on results of the thermal stress test, reassigning the ID numbers to each of the plurality of special-purpose processing units in a different order.

16. The article of claim 13, wherein the code is further executable for:

receiving input from a user; and based on the input, reassigning the ID numbers to each of the plurality of special-purpose processing units in a different order.

17. The article of claim 13, wherein the ID numbers are assigned by a management controller of the information handling system.

18. The article of claim 13, wherein the order is further determined based at least in part on peer-to-peer connectivity of the plurality of special-purpose processing units.

* * * * *